(12) United States Patent
Goldfarb et al.

(10) Patent No.: US 9,742,637 B2
(45) Date of Patent: *Aug. 22, 2017

(54) SYSTEM AND METHOD OF HIGH VOLUME RULE ENGINE

(71) Applicant: Verint Systems Ltd., Herzliya, Pituach (IL)

(72) Inventors: Eithan Goldfarb, Ness Ziona (IL); Yitshak Yishay, Pituach (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,377

(22) Filed: Sep. 23, 2016

(65) Prior Publication Data

US 2017/0078163 A1 Mar. 16, 2017

Related U.S. Application Data

(63) Continuation of application No. 13/953,090, filed on Jul. 29, 2013, now Pat. No. 9,491,069.

(30) Foreign Application Priority Data

Jul. 29, 2012 (IL) .......................................... 221174
Jul. 29, 2012 (IL) .......................................... 221177

(51) Int. Cl.
*H04L 12/26* (2006.01)
*H04L 12/741* (2013.01)
(Continued)

(52) U.S. Cl.
CPC .......... *H04L 43/028* (2013.01); *H04L 45/742* (2013.01); *H04L 45/745* (2013.01); *H04L 63/0263* (2013.01)

(58) Field of Classification Search
CPC ........................ H04L 43/028; H04L 63/0263
(Continued)

(56) References Cited

U.S. PATENT DOCUMENTS 8,065,721 B1* 11/2011 Shah .................... H04L 63/0209
726/13
8,098,677 B1* 1/2012 Pleshek ................. H04L 43/028
370/351

(Continued)

*Primary Examiner* — Dustin Nguyen
*Assistant Examiner* — Javier O Guzman
(74) *Attorney, Agent, or Firm* — Meunier Carlin & Curfman

(57) ABSTRACT

A rule engine configured with at least one hash table which summarizes the rules managed by the engine. The rule engine receives rules and automatically adjusts the hash table in order to relate to added rules and/or in order to remove cancelled rules. The adjustment may be performed while the rule engine is filtering packets, without stopping. The rules may be grouped into a plurality of rule types and for each rule type the rule engine performs one or more accesses to at least one hash table to determine whether any of the rules of that type match the packet. In some embodiments, the rule engine may automatically select the rule types responsive to a set of rules provided to the rule engine and adapt its operation to the specific rules it is currently handling, while not spending resources on checking rule types not currently used.

20 Claims, 5 Drawing Sheets

(51) Int. Cl.
*H04L 12/747* (2013.01)
*H04L 29/06* (2006.01)

(58) Field of Classification Search
USPC .......................................................... 709/224
See application file for complete search history.

(56) References Cited

U.S. PATENT DOCUMENTS

2009/0199266 A1* 8/2009 Kling ................. H04L 63/0263
726/1
2013/0301641 A1* 11/2013 Anand ................ H04L 63/0227
370/389
2013/0347103 A1* 12/2013 Veteikis ................ H04L 43/04
726/22

* cited by examiner

SYSTEM AND METHOD OF HIGH VOLUME RULE ENGINE

RELATED APPLICATIONS

The present application is a continuation of, and claims the benefit priority to, U.S. patent application Ser. No. 13/953,090, filed on Jul. 29, 2013, the disclosure of which is incorporated by reference herein.

FIELD OF THE DISCLOSURE

The present disclosure relates generally to rule engines, and particularly to real-time rule-engines required to operate with high throughputs.

BACKGROUND OF THE DISCLOSURE

Packet based communication networks include nodes which perform various tasks on the packets passing on the network. These tasks include, for example, firewall access control, traffic routing, QoS (Quality of Service) implementation and traffic probing. As different packets are handled differently, network nodes generally employ a rule engine which is configured with rules for handling packets. Each rule identifies a group of packets and indicates the handling to be applied to that group of packets. Packets received by the node are compared to the rules until a match is found and then the handling indicated by the matching rule is applied to the packet and generally to all subsequent packets belonging to the same session (referred to herein also as a packet connection).

When a rule engine needs to apply a large number of rules, its performance may suffer due to the time needed in order to check all the rules, the amount of memory required and the increasing number of memory accesses, which are relatively slow operations.

U.S. Pat. No. 7,139,837 to Parekh et al. describes a rule engine which traverses a mesh having path nodes and path edges arranged in a tree part and graph part. The rule engine manages session entries for packets, such that the rule checking performed for a first packet of a session can be used to speed up the handling of further packets belonging to the session.

U.S. Pat. No. 6,857,018 to Jiang describes using a multiple dimension spatial indexing and mapping to speed up rule lookup in a table.

U.S. Pat. No. 8,005,945 to Cohen et al. describes adjusting the rules to segregate their ranges and minimize the number of rules.

A paper titled: "Deep Packet Inspection using Parallel Bloom Filters", by Sarang Dharmapurikar, Praveen Krishnamurthy Todd Sproull and John Lockwood, Hot Interconnects 11, IEEE Computer Society, pp. 52-61, January 2004, suggests using Bloom filters to identify packets that potentially include predefined strings in their payload and then using an independent process to eliminate false positives.

A paper titled: "Fast Pattern-Matching Techniques for Packet Filtering, by Alok S. Tongaonkar, Master of Science in Computer Science, Stony Brook University, May 2004, describes applying techniques for pattern matching in packet filtering systems.

A paper titled "Packet Classification for Core Routers: Is there an Alternative to CAMs?", by Florin Baboescu, Sumeet Singh, George Varghese, IEEE Infocom, 2003, suggests filtering packets using a two dimensional filter on the IP source and destination addresses at a first step and then searching through the received results.

US patent publication 2011/0102157 to Tarkoma describes using a Bloom filter to filter out packets that should not be sent to a receiver.

US patent 2010/0195653 to Jacobson describes packet routing using a longest-prefix-match lookup engine which may be implemented using a TCAM, tree structure or Bloom filter.

US patent publication 2009/0182867 to Milliken et al. describes a method of identifying malicious packets by comparing results of applying a hash function to packets with previously generated hash results of the malicious packets.

SUMMARY OF THE DISCLOSURE

An embodiment that is described herein provides a rule engine which is designed to check packets for a large number of rules at high speeds.

There is therefore provided in accordance with an embodiment of the present invention, a method of screening data packets for matching rules by a processing unit, including receiving packets, by the processing unit, generating for each received packet, one or more first lookup keys from one or more fields of the packet, accessing, for the generated one or more first lookup keys, a data structure which correlates between key values and records indicating further acts to be performed in determining whether a packet corresponding to the key value matches a rule, wherein at least some of the records indicate one or more specific tests to be applied to the packet to determine whether the packet matches a rule, which specific tests are adjusted to the value of the key used in accessing the record, performing the further acts indicated by the accessed record so as to determine whether the packet matches a rule, and applying rules determined to match packets, to the matching packets.

Optionally, generating the one or more first lookup keys includes generating at least one first lookup key based on a plurality of fields of the packet.

Optionally, generating at least one of the lookup keys includes generating a key based on a result of applying an operator to one or more fields of the packet.

Optionally, at least some of the records indicate one or more second lookup keys to be used in one or more respective further accesses to the data structure.

Optionally, at least some of the records in the data structure indicate a plurality of second lookup keys to be used in a further access to the data structure.

Optionally, at least one first record indicates a single second lookup key and at least one second record indicates a plurality of second lookup keys. Optionally, the data structure includes a Hash table, a TRIE, a TCAM and/or a Bloom filter.

Optionally, the data structure includes for each lookup key:
  an indication that there are no corresponding rules;
  an indication of a rule record for a final determination of whether the packet matches a specific rule; or
  an indication of one or more additional lookup keys to be used in additional accesses to the data structure.

Optionally, performing the further acts includes performing for a first packet a single additional access to the data structure resulting in accessing a rule record and performing for a second packet an additional access resulting in another additional access.

Optionally, generating for each received packet one or more first lookup keys includes generating for one or more packet a plurality of different first lookup keys.

Optionally, the accesses to the data structure for the plurality of different first keys of the packet are performed for all the first keys even if a matching rule was already found for the packet.

Optionally, the method includes storing the results of the determination of whether the packet matches a rule in a session flow table, for at least some packet sessions, for further use on subsequently received packets of the session.

Optionally, the method includes determining whether the packet belongs to a session recently handled and selecting a handling of the packet, if determined to belong to a recently handled session, responsively to a previous handling determined for the session.

Optionally, the method includes determining whether data structure entries were changed or added after a handling of a previously handled packet of the session, and accordingly determining which first lookup keys are generated and used in accessing the data structure.

Optionally, the method includes determining when a packet of the session was first handled, and not using the handling previously determined for the packet of the session, if a packet of the session was first handled before about a predetermined time.

Optionally, at least one of the records indicates a time at which a newly received packet is not to be handled based on a previous handling determined for the session.

Optionally, the method includes changing the content of data structure entries as a function of time.

Optionally, the method includes receiving by a rule manager processor rules to be implemented and updating the data structure to implement the received rules, while the processing unit is receiving packets and accessing the data structure, without locking the operation of the processing unit.

There is further provided in accordance with an embodiment of the present invention, a rule engine, including an input interface for receiving packets, a memory unit configured with at least one data structure correlating between packet key values and indications of rules to be applied to packets having the respective key values, wherein for at least some packet key values the at least one data structure includes an indication of one or more keys to be used in further access to the data structure, and a packet filtering processing unit configured to receive packets, to generate for each packet at least one first lookup key including one or more fields of the packet, to access the data structure responsive to the generated at least one first lookup keys, and to perform the further acts indicated by the data structure for the packet so as to determine whether the packet matches a rule.

Optionally, the data structure includes a TRIE and/or a TCAM. Optionally, the rule engine includes a rule manager processor configured to receive rules to be implemented by the rule engine and to update the data structure responsive to the received rules while the packet filtering processing unit is operative, without locking the memory unit for access by the packet filtering processing unit. Optionally, the rule manager processor is configured to receive a plurality of rules, to divide the rules into rule types and to configure the packet filtering processing unit with instructions on generating the lookup keys according to the rule types.

Optionally, one or more of the lookup keys includes in addition to the one or more fields of the packet, one or more result fields including results of applying an operator to one or more fields of the packet. Optionally, the data structure includes a hash table.

Optionally, the packet filtering processing unit is configured to terminate accessing a hash table entry without accessing a corresponding key of the entry, if the entry has a value indicating there are no matching rules for the packet.

Optionally, the packet filtering processing unit is configured to determine for the received packets whether they belong to a same packet connection as a recently handled packet and to determine whether the packets may be handled according to the handling of the recently handled packet without accessing the data structure.

Optionally, the packet filtering processing unit is configured to identify all the rules to which a received packet matches, continuing to search for matching rules to a packet even after a matching rule was found for the packet.

There is further provided in accordance with an embodiment of the present invention, a rule engine, including a memory unit configured with at least one hash table and with rule records and a packet filtering processing unit configured to receive packets, to generate for each packet a plurality of lookup keys, each including one or more fields of the packet, to access hash table entries responsive to the generated lookup keys, and to determine based on the accessed hash table entries whether the packet matches a rule. The packet filtering processing unit is configured to determine whether there are matching rules for each of the lookup keys, regardless of whether a matching rule was found for any of the other lookup keys.

There is further provided in accordance with an embodiment of the present invention, a rule engine, including a memory unit configured with rules belonging to a plurality of groups, at least one data structure which correlates between packets and matching rules, and a table which correlates between packet sessions and matching rules and a packet filtering processing unit configured to receive packets, to determine for each packet a session to which the packet belongs, to determine rules corresponding to a session of the packet from the table, to determine, for at least some packets, one or more groups of rules for which to access the at least one data structure to determine corresponding rules from the group, and for the determined one or more groups to access the at least one data structure with first lookup keys corresponding to the groups. In determining the groups of rules for which to access the at least one data structure, the determination for a first group is based on the time since the session was added to the table.

Optionally, in determining the groups of rules for which to access the at least one data structure, the determination for a second group is based on whether any of the rules of the second group changed since the session was added to the table.

Optionally, the first and second groups correspond to the same first lookup key. Optionally, in determining the groups of rules for which to access the at least one data structure, the determination for the first group is performed regardless of whether rules of the group had changed.

The present disclosure will be more fully understood from the following detailed description of the embodiments thereof, taken together with the drawings in which:

DETAILED DESCRIPTION OF EMBODIMENTS

Figure 1:
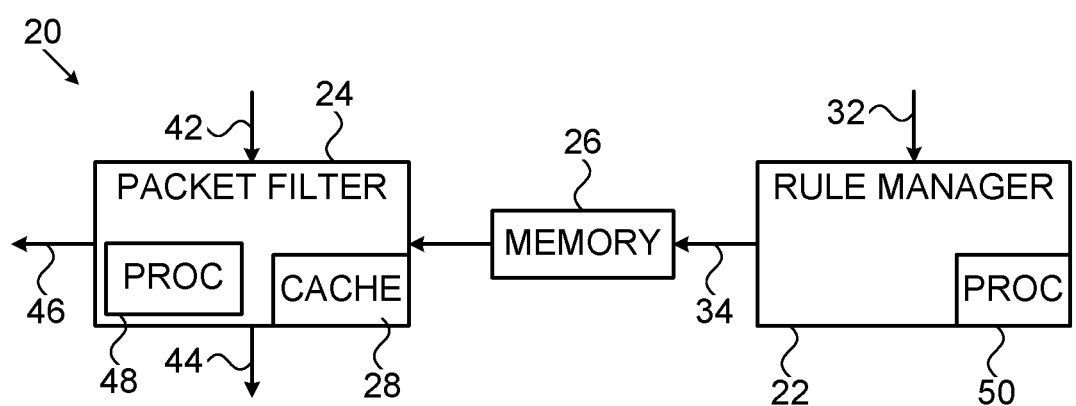
FIG. 1 is a block diagram that schematically illustrates a rule engine, in accordance with an embodiment of the present disclosure.

An aspect of some embodiments relates to a rule engine configured with at least one hash table which summarizes the rules managed by the engine. The rule engine receives rules and automatically adjusts the at least one hash table in order to relate to added rules and/or in order to remove cancelled rules. The adjustment is optionally performed within less than an hour, less than 10 minutes or even less than 1 minute from receiving the rule. In some embodiments, the adjustment is performed while the rule engine is filtering packets, without stopping the filtering.

Optionally, the rules are grouped into a plurality of rule types and for each rule type the rule engine performs one or more accesses to at least one hash table, to determine whether any of the rules of that type match the packet. In some embodiments, the rule engine selects the rule types responsive to a set of rules provided to the rule engine, possibly even responsive to the set of rules with which the rule engine is currently configured. By automatically selecting the rule types, the rule engine adapts its operation to the specific rules it is currently handling, thus allowing the user a wide range of possible rules, while not spending resources on checking rule types not currently used.

In operation, the rule engine applies a hash function to one or more groups of fields of received packets and accesses a hash table using a resulting hash key. The results of accessing the hash table determine the rules that might be applied to the packets, possibly after further tests. The use of a hash table which summarizes the rules allows implementation of a rule engine which can handle large numbers of rules, above 10,000, above 100,000 and even above a million rules, with a very fast operation. The processing power required to scan a packet is substantially constant, and does not substantially depend on the number of rules configured to the rule engine. Scanning a packet for matching rules of a specific rule type involves performing the same tasks and requires the same amount of time, regardless of the number of rules of the type.

In some embodiments, the at least one hash table includes at least one Bloom filter. The term Bloom filter refers herein to a hash table in which entries provide a negative (e.g., null) answer for at least some accesses to the hash table, without checking a key of the entry to verify that the entry actually corresponds to a key used to access the entry. In some embodiments, the hash table of the Bloom filter does not include keys in the entries at all. In other embodiments, the hash table includes keys in the entries but the key is accessed only if the entry has a value which indicates a possibility of existence of one or more rules corresponding to the entry.

The hash table is optionally designed to be sufficiently large such that most entries, or even at least 90%, 99% or 99.9% of the entries, return a negative answer, according to an estimate of the largest number of rules expected to be used. The size of the hash table is naturally, also a function of the available memory of the rule engine.

In some embodiments, for each rule type, only a single hash table access is performed. Alternatively, for one or more of the rule types, possibly even for all the rule types, a series of accesses to one or more hash tables are performed, each access in the sequence being performed only if the previous access in the sequence did not indicate that no corresponding rules are available. Optionally, the stages in the sequence do not receive any information from previous stages, except for the knowledge that the present stage was reached, which indicates that all the conditions leading to the current stage were met. Each entry is optionally configured based on the conditions already met in previous stages.

In some embodiments, the series of accesses includes one or more elimination stages in which non-matching rules are excluded without checking whether the hash key has a match in the accessed hash table entry, and one or more subsequent affirmation stages. In the affirmation stages, the hash key used to accessed the table is compared to a corresponding key in the entry and the entry is used only if the keys match. Optionally, the entry received in one of the accesses of the sequence indicates the packet fields to be used in performing the next access of the sequence. The indication may be provided in a Bloom filter hash table and/or in a hash table in which key matching is affirmed before providing a result.

In some embodiments, a key used in accessing the hash table is formed of one or more fields of the packet, possibly at least three fields or even at least five fields of the packet. Alternatively or additionally, a key used in accessing the hash table may include the result of applying one or more operators to a field or fields of the packet. Using this alternative, rules corresponding, for example, to inequalities, value ranges and/or a plurality of conditions in the alternative, may be implemented. Optionally, the key used in accessing the hash table is configurable and is changed according to the set of rules currently handled by the rule engine. In some embodiments, different keys are used in accessing the hash table in different stages of checking a packet.

Optionally, the rule engine is formed of two separate components. A first component manages the rules and prepares them for implementation and a second component performs real time filtering with minimal writing or no writing at all. The two components optionally share a memory unit in a manner allowing them both to access the memory without locking. Optionally, an add-and-delete update method is used to update a hash table in the memory. In implementing a rule change, the first component optionally puts entries required for a new version of the rule in memory locations not accessible by the second component. When everything is ready for utilization of the new version of the rule, a pointer directing to an old version of the rule is changed so that it points to the new version of the rule and then the data entries of the old version are cancelled.

An aspect of some embodiments relates to a rule engine configured to check received packets against all rules with which it is configured and to indicate all the rules that the packet matches and not just one of the matching rules.

System Overview

FIG. 1 is a block diagram that schematically illustrates a rule engine 20, in accordance with an embodiment of the present disclosure. Rule engine 20 includes a rule manager 22 and a packet filter 24. Rule manager 22 receives rules through an input interface 32, compiles the rules into an internal format of rule engine 20 and provides the compiled rules through an output interface 34 to packet filter 24. The compiled rules are optionally stored in a memory 26 shared by rule manager 22 and packet filter 24. In some embodiments, rule manager 22 directly stores the compiled rules in memory 26.

Packet filter 24 receives packets through one or more input interfaces 42 and determines for each packet whether there is a rule which pertains to the packet. Optionally, packet filter 24 is configured to check packets for matching rules by performing one or more lookups in a hash table. Optionally, each packet is checked for one or more rule types corresponding to different sets of fields of the packet, forming a lookup key into the hash table.

In some embodiments, rule manager 22 analyzes a set of rules with which rule engine 20 is configured, to determine a set of rule types (and corresponding lookup keys) for which each packet or stream of packets is checked. In addition, rule manager 22 receives rules to be configured into packet filter 24, determines a rule type that the rule will be associated with and accordingly configures the hash table and other data structures in memory 26, as detailed hereinbelow.

As a short example, rule manager 22 receives the following set of rule conditions:
Source IP=1.1.1.67 & VLAN=5
Source IP=2.2.1.67 & Dest Port=25
Destination IP=3.3.3.3 & VLAN=64 and source port=80
Source IP=2.2.1.2 & Dest Port=26 and protocol=62
Dest port=56 & VLAN=72
Rule manager 22 selects the following two rule types:
1) VLAN
2) Source IP & Dest Port
which cover the entire set of rules, as each rule can be assigned to at least one of the rule types.

Rule manager 22 then assigns each rule to a rule type, configures the hash table with the portions of the rule covered by the rule type and configures memory 26 with the additional conditions that need to be checked for those packets that match the portions of the rule matched by the rule type. For example, the first rule is assigned to the rule type of VLAN. The comparison of the VLAN field of the packet will be compared to the value "5" in a hash table lookup, as discussed hereinbelow. Packets for which a match was found will be forwarded for further handling in which Source-IP will be compared to the value 1.1.1.67.

Packets for which rules are found are handled by packet filter 24 according to the rules, while packets for which rules were not found are handled according to a default, for example are forwarded through a default output interface 44. Packet filter 24 is generally designed to handle a large number of packets, for example more than 1 million packets a second, more than 10 million packets a second, or even more than 15 million packets a second.

Rule engine 20 may be used for various tasks, such as routing, classification (e.g., as described in US patent publication 2004/0095936 to O'Neill et al.) and network security (e.g., as part of a firewall). For example, the rules may identify packets that are to be copied and forwarded through an additional output interface 46, in addition to their being forwarded through output interface 44.

Packet filter 24 optionally performs all real time tasks of rule engine 20, such that rule manager 22 has no real time tasks and can spend sufficient time and memory resources in order to achieve an optimal compilation of the rules. In some embodiments, rule manager 22 may perform the compilation with the aid of a human. In some embodiments, rule manager 22 manages hash table and/or other data structure management information, such as information on the rule or rules corresponding to each hash table entry, in a memory unit separate from memory 26, reducing the amount of information that needs to be stored in memory 26.

Rule manager 22 and/or packet filter 24 are implemented in hardware, software, firmware or combinations thereof. Rule manager 22 typically comprises one or more processors 50, memory units and required software, but may also comprise firmware or hardware. In some embodiments, rule manager 22 is implemented by a general purpose computer. The software may be downloaded to the processor in electronic form, over a network, for example. Alternatively or additionally, the software may be held on tangible, non-transitory storage media, such as optical, magnetic, or electronic memory media. Packet filter 24 is optionally implemented by a network processor 48, although other types of processors, hardware, firmware or software based may be used. Packet filter 24 optionally includes one or more cache units 28.

Packet Filter

Figure 2:
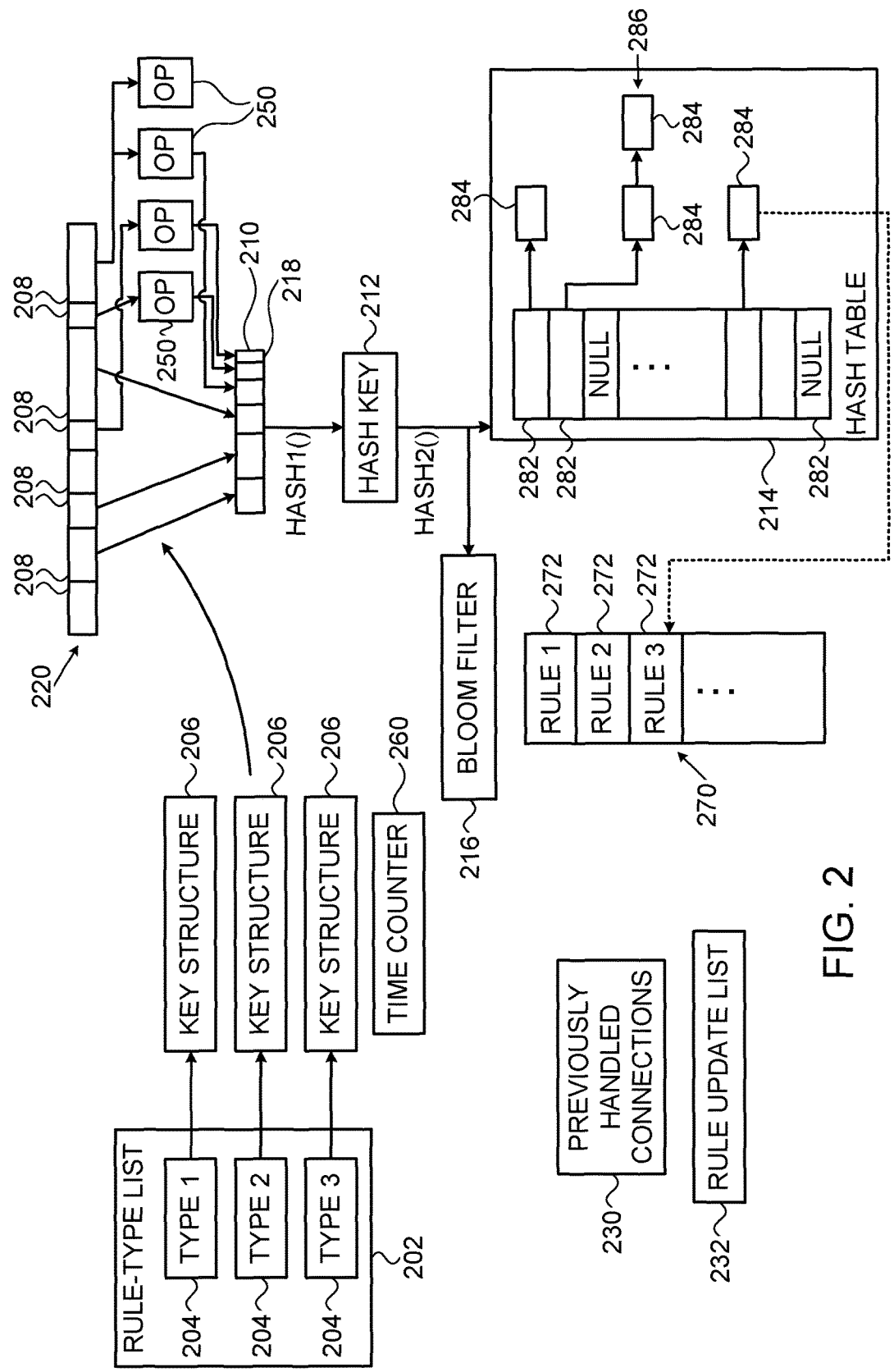
FIG. 2 is a schematic illustration of data elements used by packet filter, in accordance with an embodiment of the disclosure.

FIG. 2 is a schematic illustration of data elements used by packet filter 24, in accordance with an embodiment of the disclosure. Packet filter 24 manages a rule type list 202 which lists types of rules to which packets (represented in FIG. 2 by a packet 220) need to be compared. For each rule type, rule engine 20 manages a type-record 204 which defines the rule type and indicates the specific steps to be used for the rule type, as discussed herein below. Each type-record 204 optionally also refers to a key structure 206, which defines the fields 208 of packets 220, to be used in constructing a key 210 used in determining whether the packet meets any of the rules of the rule type. A first hash function Hash1( ) is optionally applied to key 210 to generate a hash key 212. A second hash function Hash2( ) is applied to hash key 212 in accessing a record in a hash table 214. The records of hash table 214 indicate whether packets of the specific key provided have a corresponding rule and what further handling should be applied to the packet.

Alternatively or additionally to accessing hash table 214, hash key 212 and the second hash function Hash2( ) are used to access a record in a bloom filter 216, which indicates whether packets corresponding to the key 210 may have a corresponding rule. Further elements shown in FIG. 2 are discussed hereinbelow along with the discussion of the flowchart of FIG. 3.

Figure 3:
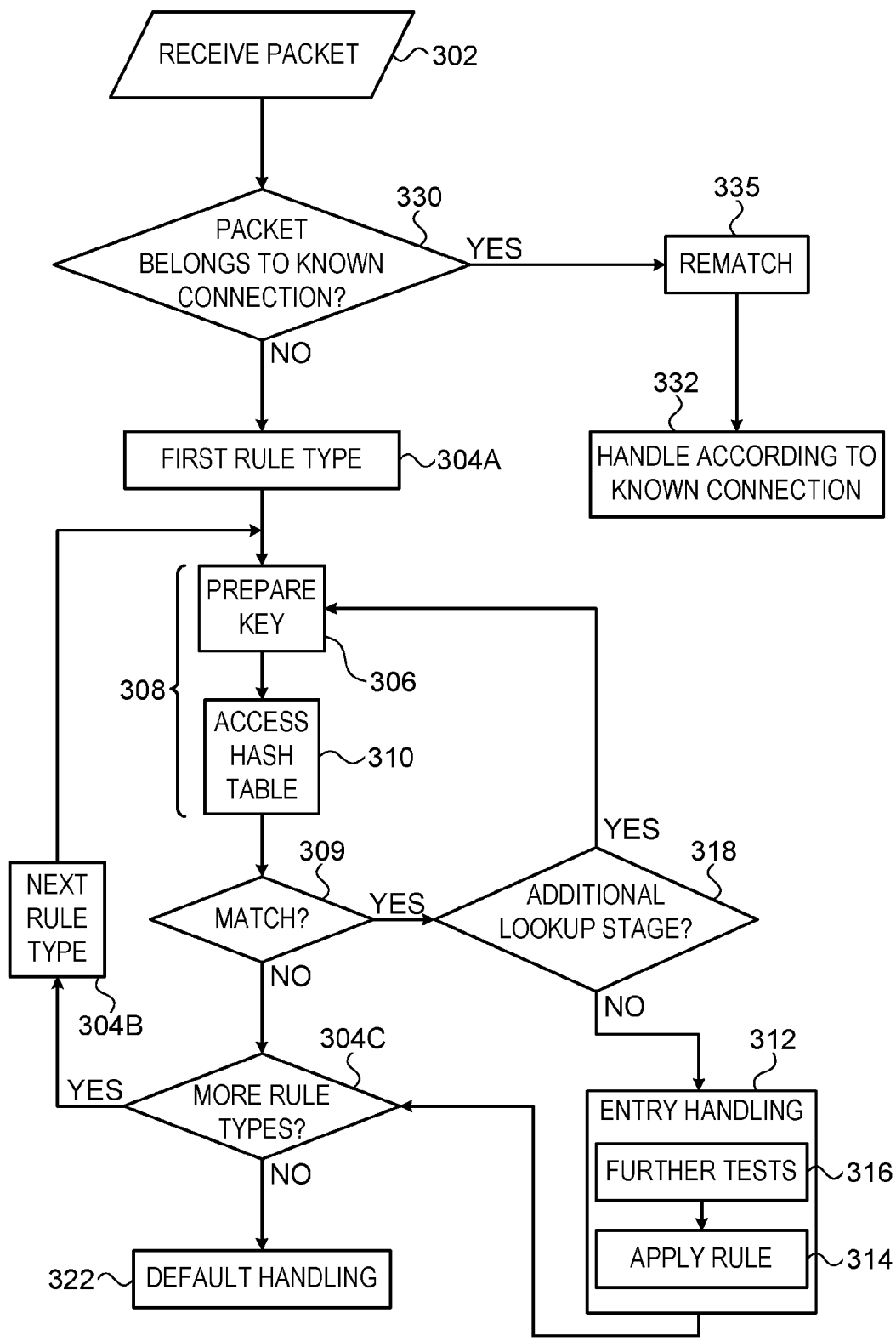
FIG. 3 is a flowchart of acts performed by a packet filter, in accordance with an embodiment of the disclosure.

FIG. 3 is a flowchart of acts performed by packet filter 24, in accordance with an embodiment of the disclosure. For each packet 220 received (302), packet filter 24 optionally determines (330) whether the packet belongs to a packet-connection for which a rule determination was recently performed. The determination (330) is optionally performed by searching a table 230 of recently handled connections. In some embodiments, the determination is performed using any of the methods described in US patent application Ser. No. 13/357,482, titled System and Method for Flow Table Management, which is assigned to the assignee of the present application and was filed Jan. 25, 2012.

If (330) the packet does not belong to a recently handled connection, packet filter 24 performs for each rule type (304A, 304B, 304C) with which it is configured, one or more (318) lookup stages (308) including preparing (306) a lookup key 210 and accessing (310) a hash table 214 and/or a Bloom filter 216. The number of lookup stages (308) and their details, such as which table is to be accessed in each stage (308), are optionally set by the contents of the corresponding type-record 204. The stages may be predetermined or may be dependent on the results of previous stages as discussed hereinbelow.

In lookup stages (308) which are last in a series or are a single stage for a rule type, the table entry accessed, if (309) there is a possibility of a matching rule, indicates the further handling (312) of the packet, for example by a pointer to a rule record 272 in a rule database 270. The further handling (312) in the rule record 272 may indicate the rule to be applied (314) to the packet and/or may indicate further tests (316) that need to be applied to the packet to determine whether it matches a rule. Lookup stages (308) followed by an additional stage optionally determine whether to continue to the next stage. In some embodiments, the result of an earlier stage in the series may also affect the structure of the key 210 used in the following stage, in addition to or instead of the key structure 206.

Lookup stages (308) are performed for all the rule types with which rule engine 20 is configured and if (309) no match is found, the packet is handled (322) according to a default handling.

In some embodiments, after handling (312) a packet according to instructions in a corresponding table entry, the packet is not tested for compliance with other rules, as rule manager 22 is configured to have each packet correspond to at most a single rule. In other embodiments, packet filter 24 checks for each packet all the types of rules, even if a match is found. In still other embodiments, the instructions in the corresponding table entry indicate whether to test the packet for matching other types of rules.

If (330) a packet belongs to a recently handled packet connection, the packet is optionally handled (332) according to the results of the previous determination, as indicated in table 230, without performing lookup stages (308). In some embodiments, packet filter 24 checks before the handling (332), in a rematch act (335), whether recent changes in the rules configured in packet filter 24 may require applying to the packet a different handling than that prescribed by table 230. Rematch act (335) optionally determines the rule types for which changes occurred, if any, and lookup stages (308) are performed only for those rule types. The recent changes are optionally also checked to determine whether a rule indicated for the packet connection by table 230 changed, in which case the handling (332) of that rule is not applied based on the entry in table 230. If the rule needs to be applied to the packet despite the change, it will be identified in the lookup stage 308 corresponding to its rule type.

In some embodiments, table 230 indicates for each packet connection recently handled, the most recent time at which the rules corresponding to the packet connection were determined. A rule update list 232 optionally lists rule types that were updated and their corresponding update times. Packet filter 24 optionally checks, in rematch act (335), for packets handled (332) according to listings in table 230, whether new rules were added since the rules corresponding to the packet connection were most recently determined. If there are one or more rule types which were updated since the most recent rule determination for the connection, packet filter 24 performs lookup stages (308) for the packet for these rule types. Table 230 is optionally periodically reviewed to remove old entries.

In some embodiments, packet filter 24 manages rule type list 202 ordered according to the time at which each rule type was last updated with a new rule. In handling received packets, packet filter 24 determines from table 230 the time at which the handling for the connection was determined. Packet filter 24 then goes through ordered list 202 in the order from the most recently changed rule type and for each rule type record 204 determines whether there was a change after the handling of the connection was most recently determined. If there was a change, a lookup stage is performed for that rule type and the determination of whether there was a change after the handling of the connection was most recently determined is repeated for the next rule type in order until a rule type changed before the handling of the session of the packet was most recently determined, at which time the handling of the packet is terminated.

Optionally, only some types of rules are taken into consideration in setting the time at which a rule type was updated. In some embodiments, rule engine 20 is configured to handle rules of different types, such as user rules which are generally configured by human users and have a low update rate and dynamic rules which are generated automatically and have a high update rate. Optionally, only user rules are taken into consideration in setting the most recent update of a rule type. Dynamic rules generally relate to recently created connections and the handling of previously established connections is not expected to change due to an update of a dynamic rule.

In some embodiments, a special rule type is defined for dynamic rules without relation to the user rules. That is, different rule types are defined for dynamic rules and for user rules and even if a dynamic rule type and a user rule type relate to the same fields they are not merged. While these embodiments may increase the number of rule types for which each packet need to be scanned, they simplify the operation of rule engine 20.

Alternatively or additionally to checking for rules updated since the determination performed for the connection of the packet, packet filter 24 checks in the rematch act 335 for packets belonging to connections established before a predetermined time. For example, packet filter 24 may identify packets whose connection was established before about a second and lookup stages 308 may be performed for the packet in order to confirm stability of the previous determination for the connection. The lookup stages performed in confirming stability may relate to all rule types or may be limited only to rule types including dynamic rules. In some embodiments, table 230 lists for each connection whether it belongs to a dynamic connection and the lookup stages performed for stability confirmation are performed only for connections identified as dynamic. The use of separate rule types for dynamic rules allows performing the stability confirmation lookup only for rule types relating to dynamic rules.

Alternatively to using rule update list 232, whenever a rule is updated table 230 is emptied. Further alternatively, whenever a rule is updated, table 230 is reviewed and packet connections matching the updated rule are removed from table 230.

In some embodiments of the invention, table 230 additionally indicates for each connection a time at which the entry for the connection is to expire, regardless of whether any rules changed. Each time the table is accessed, packet filter 24 verifies that the accessed entry of the table is still valid. Optionally, the expire time is determined from rule record 272 and/or from an entry in hash table 214. For example, when configuring rules, an expiry time may be associated with the rule, according to an expected life of the rule.

Lookup States

In some embodiments, lookup stages 308 for each rule type include at least one preliminary lookup stage in which access is made to a Bloom filter 216 and at least one later stage in which access is made to a hash table 214. The Bloom filter 216 is used for coarse filtering in order to speedily eliminate packets which clearly do not match any rule of the rule type and the hash table 214 is used for a fine tuning. It is noted that further fine tuning may be performed in the further tests (316) indicated by the rule record 272.

This option is optionally used when the percentage of packets expected to meet rules is very low, such that the Bloom filter 216 is expected to reject a large percentage of packets, optionally at least 90%, 99% or even at least 99.9%. In some embodiments, only a single lookup stage that accesses a Bloom filter 216 is used, and the rest of the lookup stages 308 access hash tables. In other embodiments, a plurality of accesses to a single Bloom filter 216 or to a plurality of different Bloom filters, are used. For example, for a specific rule type, rule manager 22 may determine that three fields 208 should be used in an elimination stage. The three fields 208 may be checked in a single elimination stage including a single access to Bloom filter 216 or in three separate accesses to the Bloom filter 216.

Optionally, each lookup stage 308 in a sequence of stages for a single rule type uses a different key 210 formed of different fields. In some embodiments, the keys 210 are totally different and do not include any common fields. Alternatively, two or more stages 308 use different keys 210, but the keys 210 have one or more fields in common. Further alternatively, two consecutive lookup stages 308, a first stage 308 accessing a Bloom filter 216 and a second stage 308 accessing a hash table 214, use the same key 210.

In some embodiments, a single access to a hash table 214 is performed in two steps. In a first step, the accessed entry is checked in a manner similar to that performed in a Bloom filter, without checking whether the accessed entry matches the hash key 212 used in accessing the entry. Only if it is determined that the entry corresponds to one or more rules is the key checked for a match. Thus, the advantage of elimination by a Bloom filter is achieved without adding an additional hash lookup stage (308). In one embodiment, only a single lookup stage 308 of this type is used for each rule type and a Bloom filter 216 separate from hash table 214 is not used at all. This reduces the memory requirements of packet filter 24 and/or the number of memory accesses performed by packet filter 24.

In some embodiments, all rule types involve the same number of lookup stages (308), for simplicity of operation of packet filter 24. In accordance with one embodiment, only a single lookup stage is used for all rule types and all additional tests are performed in the further handling (312) indicated in the rule record 272. Alternatively, different rule types may correspond to different numbers of lookup stages (308) so as to better accommodate the rules corresponding to the rule type.

Rule Types and Keys

The rule types are optionally defined according to the fields 208 of the packet to which they pertain. Each rule type pertains to a specific set of fields of the packets and these fields are included in the key 210 prepared for the rule type or keys 210 when the rule type corresponds to a plurality of lookup stages (308). For example, a first rule type may include fields which depend on IP 5 tuples (e.g., source and destination address, source and destination port and protocol), a second rule type depends on VLAN and destination address fields and a third rule type depends on a URL field.

In some embodiments, lookup key 210 is formed only of one or more fields 208 of the packet 220. In other embodiments, the lookup key 210 of one or more rule types and/or one or more lookup stages (308) includes one or more result fields 218 in addition to, or instead of fields 208 taken directly from the packets 220. Each result field 218 includes the result of applying one or more operators 250 to one or more fields 208. The use of result fields 218 allows checking inequalities and being within ranges, as well as complex conditions such as a plurality of equalities and/or inequalities connected by OR or XOR operators.

Alternatively or additionally, lookup key 210 includes one or more external fields, such as a time related field (e.g., day of week, day of month, time of day, indication of day or night).The rule types generally relate to layer-3 or layer-4 fields of the packets, but may alternatively or additionally relate to layer-2 fields and/or to higher layer fields. The fields used may include, for example, source and destination addresses and ports, application classifications of the session of the packet, VLANs, URLs, subnets of source and destination and tunneling parameters.

Typical rules may include, for example:
1) Source IP or Destination is equal X
2) Destination port=25 (SMTP)
3) Source IP=X and Destination port=80 (Web traffic of specific person)
4) Source IP=X and PORT=80 and URL=gmail.com
5) Source IP=X and application is NOT a point to point (P2P) application
6) Source or destination subnet=X.Y.Z.00 and PORT=25 (source or destination) and VLAN=Y In some embodiments, the key 210 has the same length for all the rule types, for example at least 8 bytes, at least 16 bytes or even at least 32 bytes. In one embodiment, the key 210 has a length of 32 bytes. Alternatively, the key 210 has a different length for each rule type, depending on the specifics of the rule type.

It is noted that rule engine 20 may be configured with rules relating to substantially any of the fields 208 of the packets. Optionally, rule engine is configured with rules pertaining to more than 20 different packet fields, more than 30 different fields, more than 40 different fields or even more than 50 different fields. Generally, each rule relates to no more than 5 or 10 fields, but in some cases a single rule may pertain to more than 20 or even more than 30 different fields.

Hash Table

The hash function Hash1( ) used in generating hash key 212 may be any suitable hash function known in the art, such as a CRC-32 hash function or a function which breaks key 210 into segments (e.g., byte segments) and combines the segments using a XOR operator and shift operations.

In an example embodiment, the first hash function Hash1( ) converts key 210 into a number including between 6-18 bytes, for example 12 bytes. Optionally, hash key 212 includes in addition to the hashed value of key 210, one or more fields which identify the rule type and/or the fields of the key structure of the rule type which are currently used. For example, hash key 212 may include 24 bytes: 12 bytes resulting from a hashing of key 210, 8 bytes which identify the fields being used and another 4 bytes which identify the rule type. A second hash function Hash2( ) is optionally used in accessing hash table 214 or Bloom filter 216 with hash key 212. The second hash function Hash2( ) results in a table-access number having a number of bits matching the size of the hash table, for example about 24 bits.

Optionally, instead of holding key 210 in the hash table to verify that the record reached in a lookup is the intended record, key 212 is held in the record. Using key 212 has the advantage that it is generally smaller than key 210 and requires less memory and also that it has a fixed size. In some embodiments, key 212 is large enough such that the chances of a mistaken match of the key 212 of a packet to the key 212 of a record of the hash table are negligible.

Alternatively or additionally, a further match verification is performed in the further tests (316) after reaching rule record 272.

In some embodiments, the second hash key used to access bloom filter 216 is calculated directly from key 210, without calculating the first hash key 212. Optionally, only if accessing hash table 214 along with a comparison to a hash key of the accessed record in the table is required, first hash key 212 is calculated.

In some embodiments, hash table 214 comprises an array 280 of pointers. Each entry 282 in array 280 is optionally a four byte pointer field which either has a null value, indicating there are no corresponding rules or includes a pointer to a linked list 286. The term pointer is used herein to refer to any data unit which indicates a memory location and includes absolute address values and relative offsets.

The linked list 286 includes one or more records 284 which each include a corresponding hash key for verification that the packet matches the record, and further handling instructions. The further handling instructions optionally include a pointer to a rule record 272 or information directing to a next lookup stage 308. Optionally, the number of entries 282 in array 280 of hash table 214 is relatively large, such that at least 90%, 95% or even 99% of the entries 282 are expected to have null values.

Bloom Filter

Bloom filter 216 optionally includes a Boolean table which indicates the result of the lookup stage 308. If the Boolean table location is negative (e.g., null), the possibility of a match is excluded. If, on the other hand, a match is found, packet filter 24 proceeds to the next lookup stage (308).

Each entry of the Boolean table is optionally represented by a small number of bits (e.g., a single bit), such that the entire Boolean table can be held in a small memory area and the number of entries in Bloom filter 216 may be made large, increasing the percentage of rules which are excluded in an early stage. In addition, using a small memory area for the Bloom filter 216 may increase the chances of accessed entries being found in cache 28, thus reducing the number of memory accesses. In some embodiments, packet filter 24 is configured to keep the entries of Bloom filter 216 permanently in cache memory 28 or at least to give priority in using cache 28 to the Bloom filter. This could substantially reduce the number of memory accesses, which are generally time-consuming, required by packet filter 24.

Alternatively, to a Boolean table, Bloom filter 216 may include in each entry a multi possibility value, for example a four bit or 8 bit integer, which includes additional information for cases in which the packet is not excluded. For example, the value 0 may be used to indicate that the packet does not have any matching rules, while the other values indicate the fields 208 to be used in determining whether the packet has a possible matching rule. In some embodiments, the entry value in Bloom filter 216 indicates a sub-group of the fields indicated in the key structure 206 corresponding to the rule type, to be used in the next lookup stage 308. Alternatively or additionally, the value from the Bloom filter 216 indicates fields 208 to be used, beyond those included in the key structure. Optionally, in these embodiments, instead of using the key structure 206 in generating the key 210 for the next lookup stage 308, the key 210 is generated based on the value in the entry of the Bloom filter 216.

For example, the key 210 used in accessing the Bloom filter 216 may be based only on the destination IP address. The entry in the Bloom filter 216 indicates which additional fields 208 are to be used in the key 210 used in the next lookup stage 308. For example, the code "01" may indicate using also the destination port, the code "02" using also the VLAN, the code "03" using both the destination port and the VLAN, the code "04" using an encapsulated IP address, etc.

The number of entries in the table of the Bloom filter 216 is optionally selected so that at least a predetermined percentage of the entries (e.g., at least 80%, at least 95% or even at least 99.9%), are null. Alternatively or additionally, the number of entries in the table of the Bloom filter 216 is optionally selected such that at least a predetermined percentage (e.g., at least 90%, at least 95% or even at least 99.9%) of the received packets that do not correspond to rules are excluded by the lookup in the Bloom filter 216.

In some embodiments, the Bloom filter 216 is accessed using only a single hash function (i.e., k=1). Alternatively, the bloom filter 216 is accessed with a plurality of hash functions, for example at least five or even at least 10. The number k of hash functions used is optionally selected based on the configuration parameters of packet filter 24, such as the number of entries in Bloom filter 216 and the time required for each access to the Bloom filter 216. If the accesses to the Bloom filter 216 are relatively slow, a low value of k, optionally k=1, is preferred. If, however, the accesses are relatively fast and the number of entries is relatively small, a higher value of k is selected.

In another embodiment, the values in the entries of the Bloom filter comprise a number of bits, but in accessing an entry only a sub-group of the bits, possibly only a single bit, is used. This allows, for example, easily changing the results from Bloom filter 216 over time and/or other current conditions. Optionally, in accessing Bloom filter 216, the exact bit or bits to be looked at is determined according to the time of day and/or according to a time counter 260 of packet filter 24. For example, each entry may have eight bits, seven bits corresponding to the days of the week and an eighth bit for night hours. This allows setting different rules for different days of the week and/or hours of the day. In another example, different bits are used to represent different hours of the day.

It is noted that in some embodiments, packet filter 24 sequentially goes through lookup stages (308) for the different rule types, as illustrated by FIG. 3. In other embodiments, packet filter 24 may handle a plurality of rule types in parallel, for example managing a plurality of contexts by a single processor or by a plurality of processors which operate in parallel.

Rule Compilation

Figure 4:
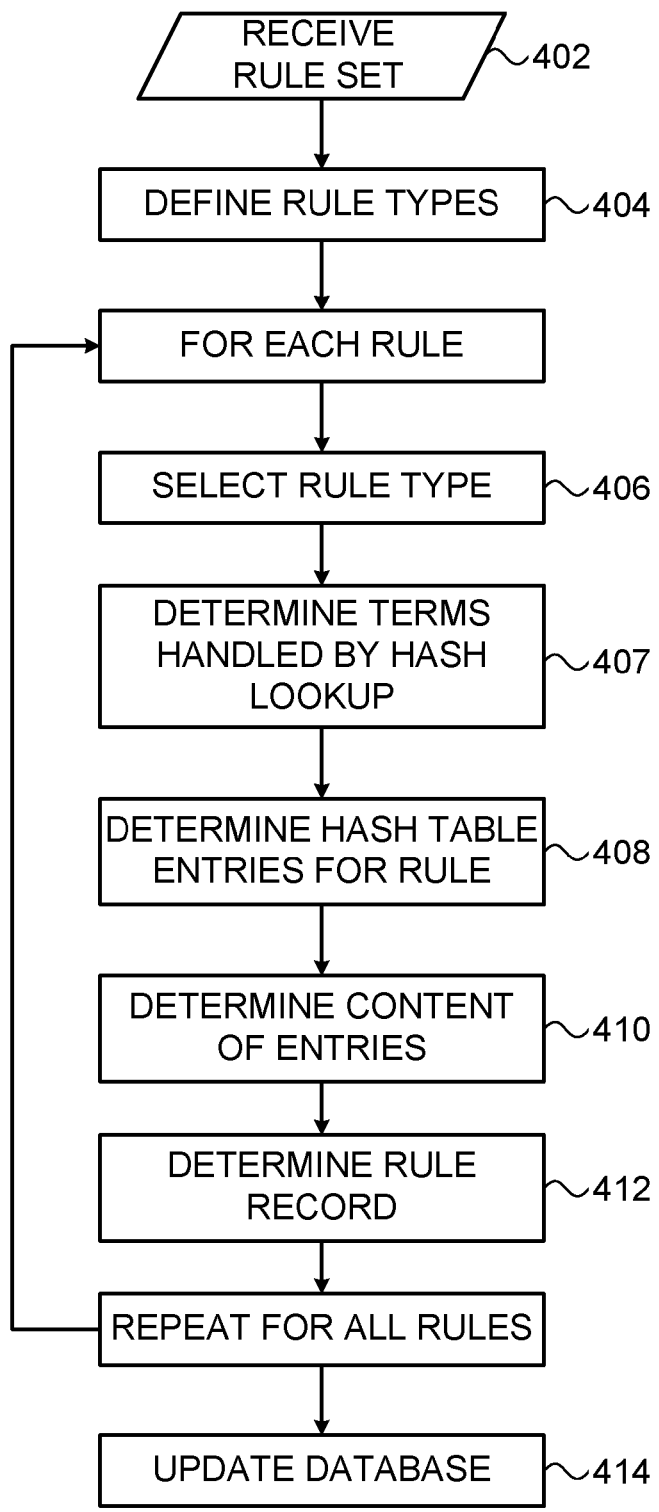
FIG. 4 is a flowchart of acts performed by rule manager in compiling rules, in accordance with an embodiment of the disclosure.

FIG. 4 is a flowchart of acts performed by rule manager 22 in compiling rules, in accordance with an embodiment of the disclosure.

Figure 5:
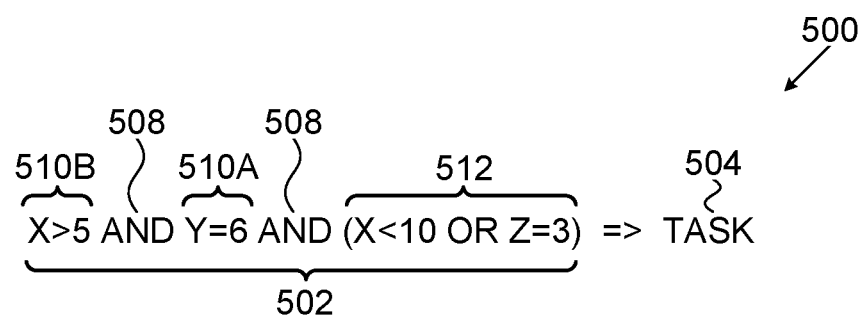
FIG. 5 illustrates a rule handled by a rule manager, in accordance with an embodiment of the disclosure.

Reference is also made to FIG. 5, which illustrates a rule 500, handled by rule manager 22, in accordance with an embodiment of the disclosure. Each rule 500 comprises a condition 502 and a task 504 to be performed on packets meeting the condition 502. The condition 502 comprises one or more terms connected by the logical AND operator 508. The terms may be simple terms 510 (marked also 510A, 510B) or complex terms 512 formed of a plurality of simple terms 510 connected by logical terms such as OR or XOR. Each simple term 510 may be an equality term 510A or a non-equality term 510B, which may include, for example, an inequality (e.g., >, <, <=, >=), range, mask, or searching for a pattern in a field 208.

In the method of FIG. 4, rule manager 22 receives (402) a set of rules which are to be enforced by rule engine 20 and accordingly defines (404) a set of rule types. The definition includes for each rule type, the fields 208 and operators 250 used in the key (or keys) 210 of the rule type.

Thereafter, for each rule, rule manager 22 selects (406) a rule type which best matches the rule. Rule manager 22 determines (407) based on the matching rule type, which terms (510, 512) of the rule are handled, at least partially, by lookup stages 308 and which are handled entirely by further tests 316.

For the terms handled by lookup stages 308, rule manager 22 optionally determines (408) the entries of hash table 214 and/or Bloom filter 216 which will be accessed by packet filter 24 in the process of handling the selected rule type, for packets that may match the rule. For each determined entry, rule manager 22 determines (410) the content that needs to be placed in the entry (e.g., entry 282 and record 284 of hash table 214) in order to direct packet filter 24 to a next lookup stage 308 or to a rule record 272 generated for the rule in rule database 270. Depending on the rule type, the entry content may merely include a match indication or may indicate fields 208 and/or operators 250 to be used in a next lookup stage 308. For the last (or only) lookup stage 308 in a sequence, the entry indicates the rule record 272 corresponding to the rule.

The required content of the rule record 272 corresponding to the rule is determined (412). The rule record 272 includes any further tests (316) that need to be performed and the handling that needs to be applied (314) to packets matching the rule. The further tests 316 include terms not handled by lookup stages 308 and/or fine tuning for terms handled only approximately by a lookup stage 308. For example, if a rule requires checking that X>=52 and the lookup stage uses an operator 250 of X>=50, the further tests include a verification that X>=52. The complexity of further tests 316 is generally not an issue, since the number of packets that reach the stage of the further tests is generally very small, such that the processing time spent on these packets is considered negligible.

In some embodiments, the further tests 316 prescribed by one or more rule records 272 direct back to one or more lookup stages 308. Thus, a complex test may be performed between two lookup stages 308. For example, if many rules having one or more common attributes compare a field 208 to different values using inequalities, a first lookup stage 308 may identify the rules having the one or more attributes and direct them to a rule record 272 which directs the complex test. The rule record 272 in such case does not include handling instructions for all the rules matching its condition. Generally, packets referred back to perform an additional lookup stage 308 will return to a different rule record 272 where the handling instructions are located.

After rule manager 22 determines required changes in the database of packet filter 24, rule manager 22 updates (414) the database in memory 26.

In some embodiments, the method of FIG. 4, including the defining of rule types (404), is performed periodically. When rule manager 22 is configured with new rules, the rules are accumulated until a next time the method of FIG. 4 is performed. Alternatively, between periodic defining of rule types, rule manager 22 receives rules and immediately, or periodically at relatively short intervals, updates the database for the rule, based on the current rule types. In still other embodiments, the defining (404) of rule types is performed only once, at installation. Another possibility used in some embodiments is that during selection (406) of rule types best matching newly received rules, rule manager 22 generally uses the current rule types, but may initiate changing of one or more rule types when such a change is determined to be useful. For example, rule manager 22 determines cases in which the difference between a new rule and the closest rule type is too large and initiates a changing of the rule types is such cases. Another possibility is that the definitions of the rule types are revisited whenever a new rule that does not match any of the current rule types is received.

The changing of the rule types may be limited to defining a new rule type or changing a single existing rule type so that it matches the rule. It is noted that when a rule type is changed, all the rules matching that rule type are optionally revisited to make sure they match the changed definition of the rule type. Alternatively, the changing of the rule types includes initiating a complete process of selection from scratch of the rule types to be used and accordingly a redefinition of the compilations of the rules.

Defining Rule Type Set

Referring in detail to defining (404) a set of rule types, in some embodiments, a predetermined set of rule types is used. Alternatively, the set of rule types is generated responsively to the received set of rules. In one embodiment, the defined set of rule types includes a separate rule type for each distinct set of fields related to by one or more rules. Alternatively, in order to reduce the number of rule types, one or more rule types in the defined set includes a limited set of fields serving as a common denominator of a plurality of different sets of fields related to by rules in the rule set. For example, for a rule set including one or more rules relating only to an IP source field, one or more rules relating to the IP source field and port source field and one or more rules relating to the IP source field and a VLAN field, a single rule type may be defined for the IP source, which rule type is intended to cover rules of any set of fields including the IP source field.

Optionally, rule manager 22 determines groups of conditions which are shared by large sub-sets of rules in the rule set and defines rule types for these groups of conditions. In some embodiments, rule manager 22 estimates, for each condition term 510 or 512, the percentage of packets that can be filtered out by the term. Particularly, rule manager 22 optionally estimates the probability of occurrence of false positive matches for rules, for various fields and defines rule sets, which are expected to achieve lowest false positive match rates. In some embodiments, fields having an expected higher distribution of values are preferred in being included in the rule sets.

The estimation is optionally based on pre-configured statistics for the various possible fields related to in the terms. Alternatively, the estimation is based on a current set of rules being considered. Optionally, the estimation is based on the particular values to which the fields are compared in the terms. For example, low port values are generally very common and therefore their filtering value is low, while high port values are relatively rare and their filtering value is high. The estimation of the percentage of packets filtered by terms relating to a port field is optionally based on the number or percentage of rules that relate to high port values.

Rule types are optionally defined for sets of terms that are expected to filter out a large percentage of the packets. It is noted that equality terms 510A can separately filter out each of the possible values of a field 208. In contrast, other terms, which involve operators 250, perform the filtering only for a single value included in the operator. For example, an inequality term 510B relating to a field 208 of a value X, relates to a specific value, such as X>5. In order to compare to another value, e.g., X>20, using the hash table lookup, another operator 250 and corresponding field in key 210 are required.

The rule types are optionally determined in a manner which minimizes the percentage of packets being false positives, that is packets that are directed in the lookup stages (308) to rule database 270 but do not correspond to a rule. This is optionally achieved by having the rule types cover the rules relatively closely.

On the other hand, the rule types are optionally determined in a manner which minimizes the processing time that needs to be spent on filtering each packet, for example by minimizing the number of operators 250, the number of memory accesses performed by the rule type and/or the number of rule types.

Optionally, the generation of the rule types takes into account the possible values of the different fields 208, for example preferring rules relating to fields having a larger number of possible values and/or a relatively low frequency for any specific value. For example, rules relating to an IP address field are optionally preferred over rules relating to TCP port, as many packets have the same port value. Optionally, rule manager is configured with the possible values of each field 208 and/or with estimated frequencies of the values of the fields.

In some embodiments, rule manager 22 defines rule types only based on equality terms 510A, and all other terms are handled in further tests 316. In other embodiments, when a very popular non-equality term 510B or 512, which can add substantially to reducing the number of false positives, is identified, an operator 250 for the term is defined and the term is included in one or more of the rule types.

Rule types optionally include only a single operator 250 for a field 208. Alternatively, a rule type may include a plurality of operators for a single field 208, for example comparing the field to different values. In some embodiments, the plurality of operators may even include contradicting conditions. For example, a rule type may include a first operator 250 for X<20 and a second operator 250 for X>30, for the same field 208 X. The inclusion of the plurality of operators in the same rule type, reduces the number of rule types required.

Optionally, when an operator 250 is defined for an inequality for a field 208 that is compared in different rules to different values, a single value or several values are selected to represent a larger number of values in the rules. For example, if a field 208 (X) is compared with a "smaller than or equal" operator (<=) in different rules to the values 55, 57, 59, 60 and 89, two operators 250 may be defined: X<=60 and X<=89. Rules requiring a comparison X<=57 are translated to the X<=60 operator 250 and the verification that X is smaller than 57 is performed in the corresponding record 272 in the further tests (316).

In some embodiments, the defining of rule types begins with a beginning set of rule types, for example including between 1-4 rule types. The rule types in the beginning set may be predetermined, or may be selected based on the current set of rules of rule engine 20. Optionally, the rule types in the beginning set are single term rule types, for the most prevailing terms. Alternatively or additionally, the beginning set of rule types includes a minimal set of single term rule types, which correspond to all rules currently handled by rule engine 20, such that each rule relates to at least one field of the set of single term rule types. The minimal set is optionally selected by selecting the fields 208 not yet included in the set, which relate to the largest set of rules not yet corresponding to a rule type in the set. Alternatively or additionally, a plurality of sets are contemplated and the set with the smallest number of rule types is selected.

Optionally, after defining the beginning set, an iterative process is performed in which a current set, initialized with the beginning set, is updated. Optionally, in each iteration, each of the rules is classified to one of the rule types in the current set and a difference between the rule and the rule type is evaluated. For rule types having a large accumulated difference, rule manager 22 determines an additional rule type which could remove a substantial number of rules from the rule type with the large accumulated difference, in a manner which minimizes the sum of the accumulated difference of both the old and new rule types. The new rule type is added to the current set if the cost of adding the additional rule type in terms of processing power of packet filter 24 is found to be smaller than the cost of the accumulated difference. The new rule type may be generated, for example, by adding a term to the old rule type and/or by removing a term. In other embodiments, a new rule type is defined when a rule is found to be farther than its closest rule type by at least a predetermined extent.

Optionally, the number of rule types is limited to a maximal number, for example 10 or 15. Alternatively, the number of rule types is not limited. Optionally, the addition of each rule type is required to achieve a total gain in processing resources. In determining whether to add a rule type, rule manager 22 optionally estimates the percentage of packets which will be rejected earlier (e.g., before reaching a record 272) due to the addition of the rule type.

While in some embodiments the selection of rule types is entirely automatic, in other embodiments the selection is performed partially or entirely by a human.

Rule manager 22 optionally determines the number of lookup stages to be used for each rule type. Optionally, rule manager 22 estimates the processing power required for each number of lookup stages and selects the most efficient number of stages. In embodiments in which all the rule types are required to have the same number of lookup stages, a minimization over all the rule types is optionally performed. In embodiments in which a maximal number of allowed stages is defined, only sequences including the allowed number of stages is considered.

Handling Rules

As to selecting (406) a rule type which best matches the rule, rule manager 22 optionally compares the rule to each rule type and determines the rule type for which the percentage of false positives is lowest. Optionally, a rule is not assigned to a rule type that relates to a field 208, not related to by the rule. Alternatively, if the possible number of values of the field 208 included in the rule type but not in the rule is relatively small and the advantage from matching the rule type for the rule is relatively high, the rule type is used. For example, when results of operators 250 are Boolean, a rule type may relate to several operators 250 although rules matching the rule type only relate to a sub-group, possibly only one or none, of the operator results.

As to determining (410) the content that needs to be placed in the entry, when the rule type has only a single lookup stage 308, the entry directs to the corresponding record 272. When a plurality of lookup stages are used, the non-last stages optionally return a Boolean answer as to whether a match is found. Alternatively, the entry of one or more lookup stages 308 may indicate the fields 208 to be used in the key 210 of the next stage. A key structure 206 is optionally defined for each lookup stage of the rule type.

As an example, if rule manager 22 is configured with several rules relating to source IP address ($IP_{src}$), source port ($Port_{src}$) and possibly another field, the rule type may correspond to two lookup stages 308. In a first stage, a lookup is performed based on $IP_{src}$ and $Port_{src}$, and the results of the lookup direct to a rule record 272, direct to another lookup stage or provide a negative answer, depending on the values of $IP_{src}$ and $Port_{src}$. For example, given the following rule conditions:

a) $IP_{src}$=123 AND $Port_{src}$=456 AND $IP_{dst}$=789
b) $IP_{src}$=123 AND $Port_{src}$=654 AND VLAN=62
c) $IP_{src}$=346 AND $Port_{src}$=291
d) $IP_{src}$=444 AND $Port_{src}$=111 AND $Port_{dst}$<291 the hash table entry corresponding to the $IP_{src}$ and $Port_{src}$ values of a, would lead to a further lookup based on $IP_{dst}$, and the hash table entry corresponding to the $IP_{src}$ and $Port_{src}$ values of b, would lead to a further lookup based on VLAN. The hash table entry corresponding to the $IP_{src}$ and $Port_{src}$ values of c and d, would lead directly to respective corresponding rule records 272 and other values would provide a negative answer indicating there are no matching rules. It is noted that the rule record 272 of c merely states the handling of the packet, as any packet reaching this record 272 matches the rule. In contrast, the rule record 272 of d includes a verification instruction, which verifies that the packet meets $Port_{dst}$<291 before moving on to the handling of the rule record 272.

As to determining (412) rule record 272, when more than one rule is directed to the same rule record 272, the further tests (316) prescribed by the rule determine which of the rules is met, if any. In such case, the portion of the record 272 indicating the handling that needs to be applied (314) to packets matching the rule may include several different handling methods, for the different matching rules.

Database Update

The operation of rule manager 22 provides for each new or changed rule, required updates to hash table 214 and/or Bloom filter 216. In addition, for at least some rules, a record 272 needs to be generated or updated. Also, changes to the rule types require changing type-records 204 and/or key structures 206.

The updating (414) for a batch of a plurality of new rules received together may be performed together, after determining the required changes for all the new rules. Alternatively, after determining the required updates for a rule, the updates are performed immediately and then the updates required for a following new rule are determined.

In updating (414) the database of packet filter 24 for rules being added, rule manager 22 optionally performs the updating in a manner which allows packet filter 24 to continue operating during the updating. Optionally, packet filter 24 does not write to hash table 214 and/or Bloom filter 216, such that a write collision between rule manager 22 and packet filter 24 is not possible.

In adding a new rule, rule manager 22 optionally first generates record 272 of the rule and records 284 in hash table 214. These data elements are not yet accessible by packet filter 24 as there is no pointer entry 282 leading to them. If a rule hash table record 284 for the rule already exists (e.g., due to a similar rule previously configured into packet filter 24), rule manager 22 optionally generates a new record 284 and then changes the pointer entry 282 to lead to the new record 284 and deletes the old record 284. Similarly, in some embodiments, any time a change to a record 272 is required, rule manager 22 prepares a new record in a memory location not accessible by packet filter 24 because it is not on any linked list 286. Then, in an atomic operation, e.g., a short memory write, the new record 272 is linked to from an entry of Hash table 214, in a process that does not allow collisions.

Changing to hash table entries 284 and entries of Bloom filter 216 are optionally performed in a manner which reduces the chances of a collision. Optionally, the entries are updated from the last lookup stage 308 to the first lookup stage.

When changing a rule type, new records may be required for all the rules of the rule type. Optionally, new records are generated for the rules and then the pointers are updated sequentially from the old records which are still in use, to the new records. After all the relevant pointers were changed, the old records are deleted.

If the change in the rule type is performed because of a new rule, the new rule may be first configured into packet filter 24 based on an old rule type, even if inefficient and then the change of the rule type is organized. This allows immediate implementation of the new rule without requiring waiting for changes in a rule type, which may be timely. Alternatively or additionally, packet filter 24 is configured to test packets for a limited pool of rules using prior art methods and rules waiting for changes in a rule type are included in the limited pool.

Updating (414) packet filter 24 for a rule, optionally includes listing the change in rule update list 232. Erasing a rule from packet filter 24 optionally includes erasing the rule from rule update list 232. Optionally, rule manager 22 does not change existing rules in packet filter 24, due to the complexity of such an update. Instead, a new rule is updated into the database of packet filter 24 and the old rule is removed. In some embodiments, rule manager 22 manages an internal database, listing for each rule how it was implemented in memory 26. When the rule needs to be removed, rule manager 22 can use the information in the internal database to quickly cancel the rule.

When a rule is removed and the rule is the last rule of a rule type, rule manager 22 optionally cancels the rule type by removing its type-record 204.

Optionally, packet filter 24 is configured to check for all the rules using hash table lookups. Alternatively, when rule engine 20 is configured in addition to a large number of rules handled by lookup tables, with a small number of other rules having different formats from the rest of the rules, the small number of rules may be implemented using other filtering methods, without table lookups. In such cases, for each packet, packet filter 24 performs table lookups for one or more packet types and also checks the other rules using other filtering methods.

Rule manager 22 may relate to all rules in a similar manner. Alternatively, rule manager 22 may handle different rules differently. For example, rule manager 22 may be configured to handle different rules with different priorities. Some rules may be considered of high priority meaning they must be configured into packet filter 24 within a short period, for example less than 1 second, while other rules may require configuration within less than a minute or only less than 10 minutes, allowing rule manager 22 to configure a plurality of rules together. In some embodiments, rule manager 22 handles separately human-specified rules and automatically generated rules. Optionally, each is assigned a different set of one or more rule types.

It is noted that in some embodiments the access to memory 26 is expected to be the most time consuming act of packet filter 24. Accordingly, various memory access optimization methods known in the art may be used to speed up the operation of packet filter 24. For example, various values accessed in the memory may be set to sizes which are easy to access (e.g., 32 bytes).

In the above description, the contents of the hash table entries have a single value which directs the further handling of the packet. In some embodiments, however, the result in the hash entry comprises a plurality of values corresponding to different conditions, such as different times of day or different times from configuration of the rule. In these embodiments, in each lookup, the value of the entry corresponding to the current conditions is used. This allows configuring the rule engine with rules applying only to specific conditions.

The term "real time" refers herein to tasks being performed shortly after instructions to perform the task are received, for example within less than 10 minutes, less than 10 seconds or even less than 50 milliseconds.

While the above description relates primarily to finding matching records for lookup keys using Hash tables, in other embodiments of the invention other data structures are used, such as a Trie, also known as a prefix tree and/or a TCAM (Ternary content addressable memory) or an EGT-PC (Extended Grid of Tries with Path Compression). In some embodiments, a plurality of different types of data structures are used. For example, in one embodiment, a Trie is used for a first lookup stage and a TCAM and/or Hash table is used for subsequent lookup stages. In another embodiment, in traversing the Trie, encountered nodes indicate a jump to a different node, depending on the values of the fields of the packet used to reach the node.

Conclusion

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method of configuring a packet filter to screen data packets, the method comprising:
receiving, by a rule manager processor, a set of packet filtering rules, wherein each rule includes one or more terms connected by a logical operator;
generating a set of rule types by the rule manger processor responsive to the received set of rules, wherein each rule type corresponds to a set of data packet fields such that each of the rules in the set of rules belongs to at least one rule type of the set of rule types;
selecting, by the rule manager processor, for each rule a respective rule type of the set of rules which best matches the rule, and then based on the matching rule type, determining by the rule manager processor which terms of the selected rule are to be handled by lookup stages and which terms of the rule are to be handled by further tests; and
updating, by the rule manager processor, entries in a data structure stored in memory in accordance with the lookup stages and the further tests of the selected rules, wherein the data structure comprises a hash table that is accessible by a packet filter that generates one or more first lookup keys to screen a received data packet, wherein at least one entry in the array of pointers is a four byte pointer field that includes a pointer to a memory location of a linked list, wherein linked list includes one or more records which each include (a) a corresponding hash key for verification that a received packet matches the record, and (b) further handling instructions, wherein at least some of the records in the data structure indicate a second one or more lookup keys to be used in one or more respective further accesses to the data structure by the packet filter.

2. The method of claim 1, wherein generating the one or more first lookup keys comprises generating at least one first lookup key based on a plurality of fields of the packet.

3. The method of claim 1, wherein at least some of the records in the data structure indicate a plurality of second lookup keys to be used in a further access to the data structure.

4. The method of claim 1, wherein at least one first record indicates a single second lookup key and at least one second record indicates a plurality of second lookup keys.

5. The method of claim 1, wherein the data structure further comprises a TRIE.

6. The method of claim 1, wherein the data structure further comprises a TCAM.

7. The method of claim 1, wherein accessing the data structure comprises accessing a bloom filter which is a part of the data structure.

8. The method of claim 1, wherein generating for each received packet one or more first lookup keys comprises generating for one or more packets a plurality of different first lookup keys.

9. The method of claim 8, wherein the accesses to the data structure for the plurality of different first keys of the packet are performed for all the first keys even if a matching rule was already found for the packet.

10. A non-transitory computer readable medium having instructions stored thereon for configuring a packet filter to screen data packets that, when executed by a rule manager processor, direct the rule manager processor to:
receive a set of packet filtering rules, wherein each rule includes one or more terms connected by a logical operator;
generate a set of rule types responsive to the received set of rules, wherein each rule type corresponds to a set of data packet fields such that each of the rules in the set of rules belongs to at least one rule type of the set of rule types;
select for each rule a respective rule type of the set of rules which best matches the rule, and then based on the matching rule type, determine which terms of the selected rule are to be handled by lookup stages and which terms of the rule are to be handled by further tests; and
update entries in a data structure stored in memory in accordance with the lookup stages and the further tests of the selected rules, wherein the data structure comprises a hash table that is accessible by a packet filter that generates one or more first lookup keys to screen a received data packet, wherein at least one entry in the array of pointers is a four byte pointer field that includes a pointer to a memory location of a linked list, wherein linked list includes one or more records which each include (a) a corresponding hash key for verification that a received packet matches the record, and (b) further handling instructions, wherein at least some of the records in the data structure indicate a second one or more lookup keys to be used in one or more respective further accesses to the data structure by the packet filter.

11. The non-transitory computer readable medium of claim 10, wherein generating the one or more first lookup keys comprises generating at least one first lookup key based on a plurality of fields of the packet.

12. The non-transitory computer readable medium of claim 10, wherein at least some of the records in the data structure indicate a plurality of second lookup keys to be used in a further access to the data structure.

13. The non-transitory computer readable medium of claim 10, wherein at least one first record indicates a single second lookup key and at least one second record indicates a plurality of second lookup keys.

14. The non-transitory computer readable medium of claim 10, wherein the data structure further comprises a TRIE.

15. The non-transitory computer readable medium of claim 10, wherein the data structure further comprises a TCAM.

16. The non-transitory computer readable medium of claim 10, wherein accessing the data structure comprises accessing a bloom filter which is a part of the data structure.

17. The non-transitory computer readable medium of claim 10, wherein generating for each received packet one or more first lookup keys comprises generating for one or more packets a plurality of different first lookup keys.

18. The non-transitory computer readable medium of claim 17, wherein the accesses to the data structure for the plurality of different first keys of the packet are performed for all the first keys even if a matching rule was already found for the packet.

19. A rule engine comprising:

an input interface for receiving packets;

a memory unit configured with at least one data structure correlating between packet key values and indications of rules to be applied to packets having the respective key values, wherein for at least some packet key values the at least one data structure includes an indication of one or more keys to be used in further access to the data structure, wherein the data structure includes a hash table;

a packet filtering processing unit configured to receive packets, to generate for each packet at least one first lookup key including one or more fields of the packet, to access the data structure responsive to the generated at least one first lookup keys, and to perform the further acts indicated by the data structure for the packet so as to determine whether the packet matches a rule; and a rule manager processor configured to receive rules to be implemented by the rule engine and to update the data structure responsive to the received rules while the packet filtering processing unit is operative, without locking the memory unit for access by the packet filtering processing unit.

20. The rule engine of claim 19, wherein the rule manager processor is configured to divide the rules into rule types and to configure the packet filtering processing unit with instructions on generating the lookup keys according to the rule types.

* * * * *

UNITED STATES PATENT AND TRADEMARK OFFICE
CERTIFICATE OF CORRECTION

PATENT NO. : 9,742,637 B2  
APPLICATION NO. : 15/274377  
DATED : August 22, 2017  
INVENTOR(S) : Eithan Goldfarb et al.

Page 1 of 1

It is certified that error appears in the above-identified patent and that said Letters Patent is hereby corrected as shown below:

In the Claims

Column 21, Line 64, Claim 1 "in the array of pointers" should read --in an array of pointers--

Column 22, Lines 57-58, Claim 10 "in the array of pointers" should read --in an array of pointers--

Signed and Sealed this
Second Day of January, 2018

Joseph Matal
*Performing the Functions and Duties of the*
*Under Secretary of Commerce for Intellectual Property and*
*Director of the United States Patent and Trademark Office*